United States Patent [19]

Fetchin

[11] 4,409,131
[45] Oct. 11, 1983

[54] PREPARATION OF COMO AND NIMO CATALYST USING COBALT OR NICKEL COMPLEXES THAT ARE STABLE IN BASIC SOLUTION

[75] Inventor: John A. Fetchin, Stamford, Conn.

[73] Assignee: Maine, Stamford, Conn.

[21] Appl. No.: 350,676

[22] Filed: Feb. 22, 1982

[51] Int. Cl.³ .................. B01J 21/12; B01J 23/85; B01J 21/04
[52] U.S. Cl. ............................. 502/263; 502/254; 502/257
[58] Field of Search ........... 252/458, 459, 465, 455 R, 252/470

[56] References Cited

U.S. PATENT DOCUMENTS

| 2,600,655 | 6/1952 | Jacobs et al. | 252/470 |
| 2,703,789 | 3/1955 | McKinley et al. | 252/458 X |
| 2,830,960 | 4/1958 | Broomhead | 252/458 X |
| 2,889,287 | 6/1959 | Scott, Jr. | 252/458 X |
| 2,983,691 | 5/1961 | Richardson | 252/458 X |
| 3,111,494 | 11/1963 | Leak et al. | 252/458 X |
| 3,155,627 | 11/1964 | Cole et al. | 252/458 X |
| 3,817,873 | 6/1974 | Mickelson | 252/458 X |

*Primary Examiner*—Carl F. Dees
*Attorney, Agent, or Firm*—Gordon L. Hart

[57] ABSTRACT

For preparing supported catalysts containing cobalt or nickel and molybdenum, using single solution impregnation, stable solutions of cobalt or nickel complexed with carboxylic acids are compatible with ammonium molybdate and result is superior catalysts.

9 Claims, No Drawings

PREPARATION OF COMO AND NIMO CATALYST USING COBALT OR NICKEL COMPLEXES THAT ARE STABLE IN BASIC SOLUTION

The invention relates to catalyst making and more particularly to an improved method for impregnating catalyst supports with catalytic metals.

Catalysts comprising cobalt or nickel with molybdenum on a porous support, usually on a porous alumina or silica-alumina support, have been used in hydrogen treating of petroleum distillates and residua for removal of nitrogen compounds, sulfur compounds or metal compounds, to improve the quality of petroleum refinery products.

One method for making these catalysts comprises impregnating the support with a solution of the catalytic metal salts.

Because of the difficulty of solubilizing cobalt compounds and molybdate compounds together in a solution for impregnating the catalyst support, it has often been the practice to impregnate the support in separate steps with separate solutions of first one and then another of the metal compounds. This entails more process steps than would a single solution impregnation with both metals.

A prior art single solution impregnation process has employed the use of phosphomolybdate complexes which are compatible in the solution with soluble cobalt or nickel compounds, but the solution had to be acidic to maintain the phosphomolybdate complex, and imparts a phosphorus component to the final catalyst composition.

The invention provides basic aqueous solutions in which a cobalt or nickel complex and a molybdate salt are compatibly dissolved. These basic solutions usually have pH values in the range about 8 to 10. The basic solution is used to impregnate a porous alumina or other catalyst support in one step with both of the metals in a single solution. The impregnated support is then dried and heated to deposit the catalytic metals on the catalyst support.

Compounds and complexes of cobalt or nickel in which the cobalt or nickel is cationic are generally incompatible in solutions with the molybdate salts. The present invention employs ammonium salts of anionic cobalt or nickel complexes which are compatible in solution with the molybdate ion. Thus a compatible impregnating solution is made by dissolving molybdate together with an ammonium salt of a stable anionic complex of cobalt or nickel and a carboxylic acid in a single aqueous solution.

To form the anionic complex of Co (II) or Ni (II), we use a carboxylic acid in an amount to provide at least three protons which can be ionized for every metal atom to be solubilized. The carboxylic acid ligands and the metal combine as follows to form an anionic complex:

$$L^{3-} + M^{2-} \rightarrow ML^-$$

or $$L^{4-} + M^{2-} \rightarrow ML^{2-}$$

Polycarboxylic acids having 3 or more available protons per molecule can be used in a 1:1 molar ratio with the metal ion to be complexed. Citric acid, tartaric acid and ethylene dinitrilotetraaectic acid, for example, provide four ionizable protons per ligand molecule ($H_4L$). Three protons per ligand molecule ($H_3L$) are provided by nitrilotriacetic acid, two ($H_2L$) by succinic or oxalic acid, and one (HL) by acetic acid. The $H_4L$ and $H_3L$ acids can be used in 1:1 molar ratio with cobalt or nickel to form anionic complexes of cobalt or nickel in aqueous solutions.

In the special case of $H_4L$, using ethylene dinitrilotetraacetic acid, e.g., it is also possible to form CO (III) anionic complexes by oxidation with hydrogen peroxide. The complex species forms from the following combination of Co (III) and carboxylic ligand:

$$L^{4-} + Co^{2+} \rightarrow Co^{II}L^{2-}$$

$$2Co^{II}L^{2-} + H_2O_2 \rightarrow 2Co^{III}L^- + 2OH^-$$

Using a 1:1 molar ratio of succinic acid ($H_2L$) would result in an unstable ammonium solution. When the molar ratio of succinic acid to cobalt in the solution is increased to 2:1, a stable ammonium solution results. Consistent results are found also using four moles of acetic acid (HL). Acetic acid to cobalt molar ratios of less than three will make solutions which contain cationic cobalt, even when large excesses of ammonia are used. Increasing the molar ratio to 4 or more will cause the formation of stable solutions containing no cationic cobalt.

The cobalt anionic complexes are formed by reaction of ammonia with a soluble cobaltous salt of the selected carboxylic acid. Cobalt metal or cobalt carbonate may be reacted with the selected carboxylic acid to form the cobaltous carboxylate solution. Before the addition of ammonia, while the cobaltous salt of the organic acid is in solution, presence of the cobaltous cation in solution is indicated by a red color.

On addition of ammonium hydroxide, a shift in the band maximum near 510 nm occurs in the visible spectra. A new band, with a larger extinction coefficient in the region of 520-530 nm forms, indicative of anionic carboxylate formation. The resulting purple solution differs drastically, both visually and spectroscopically, from the brown solution afforded by cationic amine complexation, such as $Co(NH_3)_6^{2+}$.

The presently most preferred carboxylic acid for making the compatible catalyst impregnating solutions is citric acid. This acid has three available acidic protons and can form the anionic metal complex when used at a 1:1 molar ratio with a cobaltous or nickelous salt. Citric acid can react with cobalt metal, so one may use powdered cobalt metal instead of cobalt carbonate to make a solution of cobaltous citrate.

Catalysts made by the basic single solution impregnation method of this invention are found to have higher catalytic activity on a relative weight activity basis than comparable catalysts made by other methods. The invention can provide economic advantage in two ways: by the manufacturing advantage of a single step impregnation and further by providing catalysts having equvialent catalytic activity with lower metal loadings.

Specific examples embodying preferred modes of carrying out the invention are described in more detail below.

EXAMPLE 1

A standard ammonium-cobalt citrate solution, containing cobalt to yield 12.0 g CoO/100 cc, was prepared as follows. Equimolar amounts of CoCO$_3$ (190.48 g) and citric acid monohydrate (336.48 g) was slurried with 400 cc H$_2$O, stirred, and heated to boiling. During the course of the reaction, bubbling due to CO$_2$ evolution occurred. After 10–20 minutes at boiling, a deep winered homogeneous solution resulted. The mixture was cooled to room temperature, accompanied by some solid precipitation. Approximately B 280 cc of concentrated ammonium hydroxide was added, and the solution was volumetrically diluted to 1000 cc. On addition of ammonia the precipitate dissolved and the color shifted to make stable purple solution.

A cobalt/molybdenum catalyst was prepared by combining 67 cc of the standard ammonium cobalt solution (containing cobalt to make 8.0 g CoO) with 34.74 g ammonium heptamolybdate, (NH$_4$)$_6$Mo$_7$O$_{24}$.4H$_2$O. The mixture was stirred and diluted to 110 cc, using concentrated ammonium hydroxide, with a slight amount of heating to promote faster dissolution. After the solution became homogeneous, it was pore saturated onto 163.68 g of alumina support which already contains about 1.0% MoO$_3$. The impregnated catalyst was dried for 3 hrs. at 175° C., then calcined for 1.5 hrs. at 500° C. Final composition showed the following analysis (by EDX):

| wt % CoO | 4.0 |
|---|---|
| wt % MoO$_3$ | 15.5 |

The catalyst was tested for HDS activity using a middle distillate blend with a concentration of 1.49 weight percent sulfur and an API gravity of 24.8°. The test was conducted using a fixed bed reactor in the down flow mode at 500 psi pressure, 5 WHSV (weight hourly space velocity) and using an excess H$_2$ flow of 750 SCF per barrel. The HDS activity was measured at temperatures of 620° F., 650° F. and 680° F. to monitor relative performance as a function of % sulfur removal. A relative weight activity per gram of promoter metals is calculated from the activity found by this test compared with the activity per gram of promoter metals found by the same test for a widely used commercial high activity CoMo HDS catalyst.

EXAMPLE 2

Using the same procedures described in Example 2 for preparing catalysts using ammonium cobalt citrate complexes, a catalyst containing 3.1% CoO and 11.9% MoO$_3$ was prepared by adding 50 cc of the standard ammonium cobalt citrate solution of Example 1 and 25.71 g ammonium heptomolybdate, all dissolved in 120 cc aqueous solution, to 173.05 g alumina support. The catalyst was tested as described in Example 1. Test results are summarized in Table 1.

TABLE 1

| Example | % CoO | % MoO$_3$ | Reaction Temp. °C. | % Sulfur Removed | RWA/g. metal |
|---|---|---|---|---|---|
| 1 | 4.0 | 15.5 | 620 | 79.8 | 116 |
|  |  |  | 650 | 88.3 | 126 |
|  |  |  | 680 | 93.5 | 117 |
| 2 | 3.1 | 11.9 | 620 | 81.2 | 152 |
|  |  |  | 650 | 88.2 | 150 |
| 4 | 2.5 | 10.8 | 620 | 77.9 | 139 |
|  |  |  | 650 | 85.4 | 127 |
| Std. Commercial HDS Cata- | 4.9 | 16.8 | 620 | 78.9 | 100 |
|  |  |  | 650 | 87.4 | 100 |
|  |  |  | 680 | 93.3 | 100 |

TABLE 1-continued

| Example | % CoO | % MoO$_3$ | Reaction Temp. °C. | % Sulfur Removed | RWA/g. metal |
|---|---|---|---|---|---|
| lyst |  |  |  |  |  |

EXAMPLE 3

Preparation of ammonium nickel complex solution

A standard ammonium nickel complex solution, which contains 12.0 g NiO/100 cc, was prepared in the following manner. Equimolar amounts of NiCO$_3$ (95.34) and citric acid monohydrate (168.74 g) were slurried in 160 cc H$_2$O, stirred, and heated to boiling. During the course of the reaction, CO$_2$ evolution occurred. After 10–20 minutes at boiling, a deep emerald-green homogeneous solution resulted. The mixture was cooled to room temperature, accompanied by some precipitation. The product was volumetrically diluted to 500 cc with water and ammonium hydroxide, resulting in a homogeneous solution with a purple-blue appearance, due to some Ni(NH$_3$)$_x^{2+}$ formation.

A nickel/molybdenum/phosphorus catalyst was prepared by combining 58 cc of the ammonium nickel complex solution, 38.65 g ammonium heptamolybdate |(NH$_4$)$_6$-Mo$_7$O$_{24}$4H$_2$O|, 25.59 g (NH$_4$)$_2$HPO$_4$, and concentrated ammonium hydroxide to dilute the volume to 104 cc. The solution had to be heated to near boiling, to achieve solubility. The solution was pore saturated onto 155.5 g alumina support which already contained ~1.0% by wt MoO$_3$. After impregnation, the catalyst was dried at 175° C. for 2.0 hrs, then calcined at 500° C., for 1.5 hrs. Final composition showed the following analysis (by EDX):

| wt % NiO | 3.2 |
|---|---|
| wt % MoO$_3$ | 16.9 |
| wt % P | 2.9 |

The catalyst was tested for HDN activity using a gas oil feedstock with a concentration of 1.3 weight percent sulfur, 660 ppm basic nitrogen compounds, 0.19 weight percent total nitrogen and an API gravity of 24.6°. The test was conducted using a fixed bed reactor in the down flow mode at 1250 psi pressure, 2.5 WHSV (weight hourly space velocity) 700° F. temperature, and using an excess H$_2$ flow of 1500 SCF per barrel. The performance is measured by removal of basic nitrogen compounds from the feedstock. During the last 20 hours of the run, the % NR (nitrogen removal) of this catalyst averaged 94.79. Compared to a high activity commercial HDN catalyst, there is a 23 percent RWA advantage for this new catalyst.

EXAMPLE 4

By the same procedure described in Example 1, standard ammonium cobaltate solutions were made and used to impregnate cobalt with molybdenum on catalyst supports, but using instead of critic acid other organic acids in amounts to provide equivalent protonic proportions of the respective acids. The acids that were used in proportions of one mole acid per mole of CoCO$_3$ as with citric acid were ethylene dinitrioltetraacetic acid (EDTA) and tartaric acid. When succinic acid was used in one to one proportion, the ammoniacal solution was unstable. However, when the proportion was increased to two moles of succinic acid, a stable purple solution resulted.

Ammonium Cobalt Succinate Solution

A mixture of 94.48 succinic acid and 47.62 g $CoCO_3$ were stirred with 100 cc $H_2O$ and heated. After $CO_2$ evolution and cooling, the product was diluted to 250 cc with ammonium hydroxide solution. A solution for impregnation was prepared with 50 cc ammonium cobalt succinate, 25.71 g ammonium heptamolybdate, 20 cc ammonium hydroxide, and 45 cc $H_2O$, resulting in a 120 ml solution. The catalyst was prepared by adding the impregnating solution to 173.05 g alumina support, then drying and calcining as outlined in Example 1.

A suitable HDS catalyst containing 2.5% CoO and 10.8% $MoO_3$ resulted. All of the above stable solutions were used for making active cobalt-molybdenum desulfurization catalysts as in Example 1. These catalysts had relative weight activities about equivalent to those in Example 1.

EXAMPLE 5

By the same procedure described in Example 3, a standard ammonium nickelate solution was made and used to impregnate nickel with molybdenum on a catalyst support, but using nitrilotriacetic acid (NTA) in equivalent molar porportion (1:1) instead of citric acid. This catalyst had HDS relative weight activity about equivalent to that in Example 3.

We claim:

1. A stable, basic impregnating solution comprising a basic molybdate salt and a basic salt of an anionic complex of cobalt or nickel complexed with a carboxylic acid selected from acetic acid, tartaric acid, succinic acid and citric acid in amounts to provide at least three available proton sites per cobalt or nickel atom in said complex, both of said salts being dissolved in a single basic aqueous solution.

2. A solution defined by claim 1 wherein the defined basic salts are ammonium salts and the defined complex is an anionic complex of cobalt or nickel and citric acid.

3. A solution defined by claim 1 wherein the defined basic salts are ammonium salts and the defined complex is an anionic complex of cobalt or nickel and tartaric acid.

4. A solution defined by claim 1 wherein the defined basic salts are ammonium salts and the defined complex is an anionic complex of cobalt or nickel and succinic acid.

5. A method of making a catalyst comprising cobalt or nickel and molybdenum on catalyst support, said method comprising impregnating a porous catalyst support with a solution defined by claim 1 and then drying and calcining the impregnated support.

6. A method of making a catalyst comprising cobalt or nickel and molybdenum on catalyst support, said method comprising impregnating a porous catalyst support with a solution defined by claim 2 and then drying and calcining the impregnated support.

7. A method of making a catalyst comprising cobalt or nickel and molybdenum on catalyst support, said method comprising impregnating a porous catalyst support with a solution defined by claim 3 and then drying and calcining the impregnated support.

8. A method of making a catalyst comprising cobalt or nickel and molybdenum on catalyst support, said method comprising impregnating a porous catalyst support with a solution defined by claim 4 and then drying and calcining the impregnated support.

9. A catalyst made by the method defined by claim 5 wherein the catalyst support is porous alumina, or silica alumina.

* * * * *

UNITED STATES PATENT OFFICE
CERTIFICATE OF CORRECTION

Patent No. 4,409,131          Dated  October 11, 1983

Inventor(s)   JOHN ALLAN FETCHIN

It is certified that error appears in the above-identified patent and that said Letters Patent are hereby corrected as shown below:

Change line [73] to read as follows:

[73] Assignee: American Cyanamid Company, Stamford, Connecticut

Column 2, line 10 - change "CO (III)" to -- Co (III) -- .

Column 3, line 8  - cancel "B".

Signed and Sealed this

Thirty-first Day of January 1984

[SEAL]

Attest:

GERALD J. MOSSINGHOFF

Attesting Officer

Commissioner of Patents and Trademarks